Oct. 8, 1929.  B. B. HOLMES ET AL  1,731,048
WINDSHIELD WIPER AND FLUID MOTOR THEREFOR
Filed Feb. 19, 1927
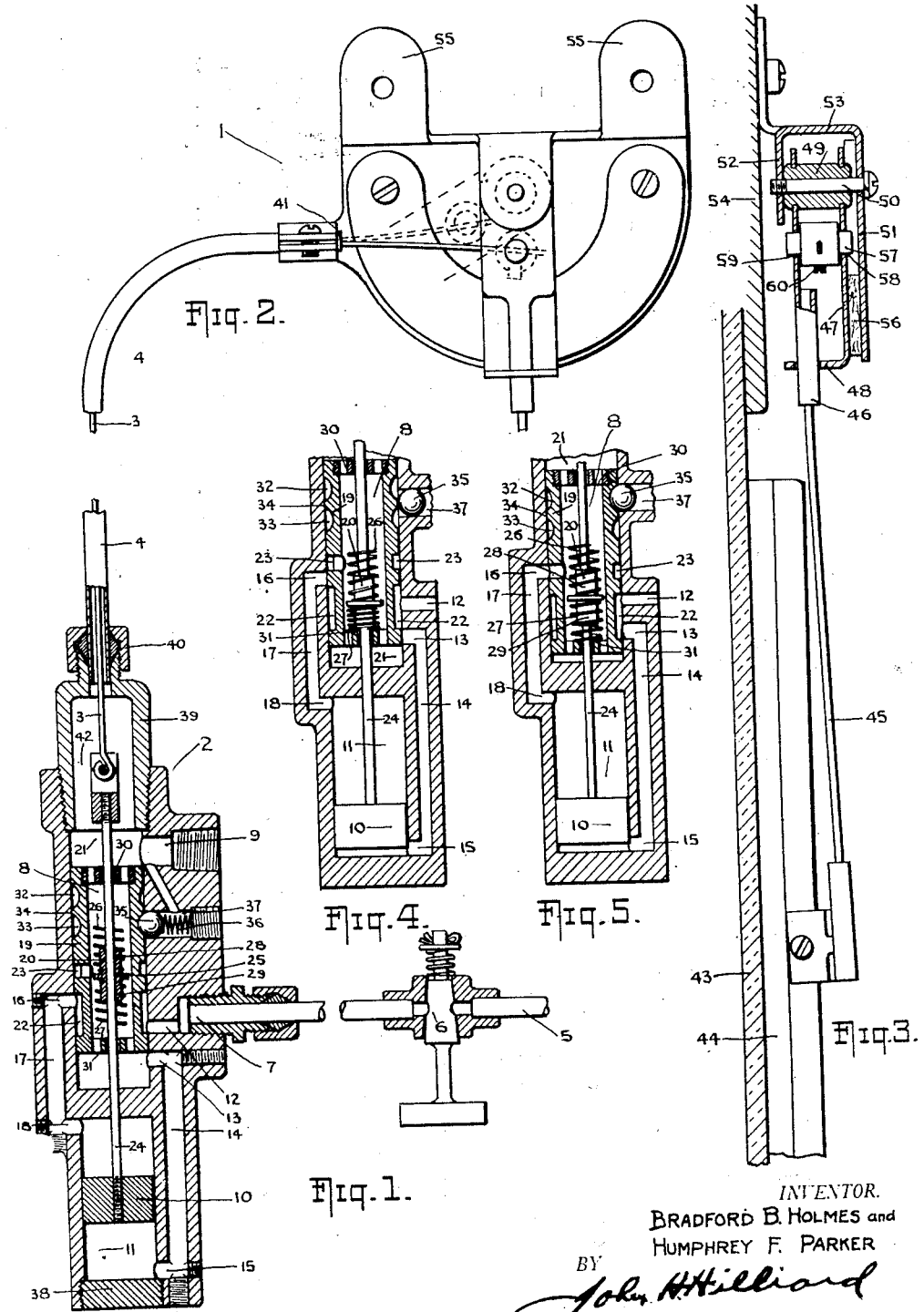
INVENTOR.
BRADFORD B. HOLMES and
HUMPHREY F. PARKER
BY John H. Hilliard
ATTORNEY.

Patented Oct. 8, 1929

1,731,048

UNITED STATES PATENT OFFICE

BRADFORD B. HOLMES AND HUMPHREY F. PARKER, OF NEW YORK, N. Y.

WINDSHIELD WIPER AND FLUID MOTOR THEREFOR

Application filed February 19, 1927. Serial No. 169,621.

Nearly all types of internal combustion engines of the present day, and particularly those used on automobiles and motor craft, are equipped with a so called force-feed lubricating system which involves pipe lines leading from a source of oil supply to the various points to be lubricated together with a suitable force pump for creating the necessary pressure. Also in most types of automobiles, and in many other types of motor craft, apparatus is provided for cleaning the windshield, in order to remove rain drops, etc., and to enable a clear view ahead to be obtained under all conditions. We have discovered that the lubricating system above referred to offers an advantageous source of power for operating this windshield wiper, and it is the primary object of our invention to provide a means and method of utilizing this source of power for windshield cleaning purposes. Another object of the invention is to provide a windshield wiper that will function under all conditions of engine operation, particularly at wide open throttle, and one that has adequate power under all conditions for a small compact motor.

We find that in the case of most feed installations ample power for operating a windshield wiper may be secured without utilizing more than a small part of the oil flow. In point of fact the capacity of such systems is practically always so great that the pump delivers considerably more oil than escapes at the bearings and this excess oil is returned to the crankcase through a relief valve. While it is immaterial to the scope of our invention whether all or only a part of a particular available oil supply is used for actuating the windshield wiper motor, we have described in the particular embodiment of our invention which we have selected as a preferred form a system in which only a part of the oil flow is utilized for actuating our motor. We have also selected the use of oil pressure to operate the motor but it should be understood that the motor is actuated by the difference of pressure between the inlet and the outlet, and that oil suction may equally well be used.

The invention is illustrated in the following drawings, in which:

Fig. 1 is a longitudinal section through the fluid motor for operating the windshield wiper.

Fig. 2 is a rear view of the wiper.

Fig. 3 is a side view of the wiper, and

Figs. 4 and 5 are sections through the fluid motor showing relative positions of various parts at intermediate points in the cycle of operation.

The windshield wiping unit 1 is connected with the fluid motor 2 by the wire 3 in the tube 4. This motor is actuated by oil pressure derived from the lubricating oil pump of the engine, the oil flowing through the pipe 5 and the valve 6 to the oil inlet 7. Its flow through the motor is controlled by the valve unit 8; it leaves the motor through the outlet 9 whence it is returned to the sump of the engine. The wire 3 is actuated by the piston 10 which reciprocates in the cylinder 11, oil being delivered alternately to the lower side by the passages 12, 13, 14, and 15, and to the upper side by the passages 12, 16, 17, and 18. The valve unit 8 comprises a shell 19 and a core 20. The shell 19 reciprocates in the cylinder 21; its outer surface has annular passages cut around it at 22 and 23, and these annular passages and the lower portion of the shell itself control the flow of oil into and out of the short passages or ports 13 and 16. The core 20 is securely fixed to the rod 24, the lower end of which is attached to the piston 10 and the upper to the wire 3; it consists of a central portion 25 which provides shoulders for the springs 26 and 27, and upper and lower portions 28 and 29, which contact with the ends 30 and 31 of the shell 19. This shell has, in addition to the flow controlling annular passages 22 and 23, two other grooves 32 and 33, separated by the shoulder 34. These grooves form alternate seats for the ball 35 which is urged into them by the spring 36 in the chamber 37. The end of the cylinder 11 is closed by the plug 38, the opposite end of the fluid motor 2 being closed by the plug 39 into which the tube 4 is clamped by the nut 40. It will be noted that no stuffing box is provided for this tube although its upper end 41 is open to the atmosphere. The chamber 42 is subject only to the pressure necessary to force the discharge oil back to the sump. This pressure is small so that oil is forced only a short distance up the tube 4 against the force of gravity; the tube is of sufficient diameter to avoid the effects of capillarity.

The windshield glass is shown at 43; in contact with it is the rubber blade 44, which is attached to the supporting arm 45 of spring wire. The upper end of this wire is gripped by the lower end of the stamping 46, which is bent round to form a tube. This stamping is fixed to the stamping 47 by passing its lower tubular portion through a hole in the bent over portion 48 of 47, and riveting the two upper portions together by the rivet 49. This rivet is drilled for the small bolt 50 which acts as the shaft or axis for the semi-rotary motion of the wiper blade arm 45. The bolt 50 also passes through the plate 51 and lug 52 of the stamping 53, which is fixed to the windshield frame 54 by the lugs 55. The fibre strip 56 is attached to the plate 51 of the base stamping 53 and acts as the thrust block for the lower portion of the stamping 47, forcing the wiper blade against the windshield glass by the spring in the slightly bent wire 45. The short shaft 57 is free to rotate in the holes 58 and 59 in the stampings 46 and 47; it is drilled transversely to receive the upper end of the operating wire 3, which is locked to it by the set screw 60. It will be seen that reciprocating motion in the wire 3 causes the arm 45 and the wiper blade 44 to partially rotate about the bolt 50. The blade 44 thus sweeps back and forth over the windshield through a sufficiently wide arc, and clears the swept portion of raindrops etc. The operating wire 3 is of piano wire, and is of sufficiently small diameter to permit of the bending that occurs when it moves from the position shown in full lines with the wiper arm in mid-position, to that shown in dotted lines when the wiper arm is at the limit of its travel.

Referring now to Fig. 1 it will be noted that the plunger is in its mid-position. Oil is entering the upper portion of cylinder 11 through the passages 12, 22, 16, 17, and 18, forcing the plunger downwards and at the same time expelling oil from beneath the plunger through the passages 15, 14, 13, through the hollow center of the valve 8 to the outlet 9 and thence back to the sump of the engine. The valve shell is stationary in its upper position and is held there by the ball 35 in the groove 33. At the moment there is no force tending to displace it. . . . The core 20 is moving downwards but is not in contact with any other part of the valve mechanism. As the downward motion of the plunger continues, however, the bottom of the spring 27 comes in contact with the lower end 31 of the valve shell 19; the power of the spring is insufficient to move the shell against the resistance of the ball 35 forced by the spring 36 into the groove 33, so spring 27 is compressed until the lower end of the core comes in contact with the bottom of the shell. The full force of the oil on the plunger now acts to displace the valve shell, through the rod 24 and the core 20. The shell, therefore, starts to move downward, changing the position of the annular passages 22 and 23 relative to the ports 13 and 16, but not completely shutting off the flow of oil. At the same time the ball 35 is being forced out of groove 33 and is moving on to the top of the shoulder 34 between the grooves (see Fig. 4). When it attains this position midway between the grooves 32 and 33, the top of the annular passage 22 moves below the port 16 shutting off the inflow of oil to the top of the cylinder 11; its bottom however, starts to uncover port 13 admitting oil through the passages 13, 14 and 15, to the space below the piston. Simultaneously the bottom of the valve shell is closing the port 13 against the outflow of oil and the annular passage 23 is opening a passageway from the top of cylinder 11, via 18, 17 and 16 through the center of the valve shell to the outlet 9. Just before this condition is attained the pressure of the spring 27 exceeds the resistance of the ball 35 and the valve shell moves suddenly downward, being assisted by the ball pressing on the lower slope of the groove 32. The force of the spring 27 weakens as it extends and the assistance of the ball changes to resistance when it reaches the bottom of the groove, so that the shell stops in its lower position with the ball at the bottom of the groove 32. This condition is shown in Fig. 5. It will be noted that the passages permitting the flow of oil to the bottom of the cylinder 11 and from the top thereof are wide open, so that under the pressure of the oil on its bottom the plunger 11 moves upward. In the course of this upward movement of the plunger the core 20 moves upwards, the spring 26 is compressed against the top 30 of the shell 19 and the latter is carried upwards when the top of the core contacts with it; the ball 35 is forced from the groove 32 onto the shoulder 34 and the shell flips back to its lower position, reversing the port openings and restoring the condition shown in Fig. 1, thus completing the cycle.

Normally, of course, it is not necessary to use the windshield wiper; a valve 6 is therefore placed in the pipe 5 from the oil pump to the fluid motor 2. When this is closed oil is unable to reach the motor and the wiper remains at rest. When it is desired to start it, the knob 61, which is accessible from the driver's seat, is given a turn, opening the valve, permitting oil to reach the motor, and starting the motor in operation. The speed of the wiper may, within limits, be controlled by the amount of opening given to the valve.

We claim:

In a windshield wiper for motor vehicles of the type propelled by an internal combustion engine having a force-feed lubricating system, the combination of a wiper mounted to reciprocate over the windshield glass, a liquid pressure operated motor for actuating said wiper, said motor being operatively connected with said pressure lubricating system to be operated thereby.

In testimony whereof, we have signed this specification.

BRADFORD B. HOLMES.
HUMPHREY F. PARKER.